(12) United States Patent
Schwarz et al.

(10) Patent No.: US 9,026,267 B2
(45) Date of Patent: May 5, 2015

(54) METHODS AND SYSTEMS OF SELECTIVELY ENABLING A VEHICLE BY WAY OF A PORTABLE WIRELESS DEVICE

(75) Inventors: Stanley G. Schwarz, Indialantic, FL (US); Jeffrey H. Frank, Littleton, CO (US); Christopher M. Macheca, Centennial, CO (US); Gerald A. Morgan, Littleton, CO (US); Franco Chirico, Highlands Ranch, CO (US)

(73) Assignee: **Gordon*Howard Associates, Inc.**, Littleton, CO (US)

( * ) Notice: Subject to any disclaimer, the term of this patent is extended or adjusted under 35 U.S.C. 154(b) by 481 days.

(21) Appl. No.: 13/229,398

(22) Filed: Sep. 9, 2011

(65) Prior Publication Data

US 2012/0239223 A1    Sep. 20, 2012

Related U.S. Application Data

(60) Continuation-in-part of application No. 12/826,513, filed on Jun. 29, 2010, which is a division of application No. 11/684,186, filed on Mar. 9, 2007.

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *G06Q 30/06* | (2012.01) |

(52) U.S. Cl.
CPC ...................................... *G06Q 30/06* (2013.01)

(58) Field of Classification Search
USPC ............................................................ 701/2
See application file for complete search history.

(56) References Cited

U.S. PATENT DOCUMENTS

| | | | |
|---|---|---|---|
| 4,335,370 A | 6/1982 | Scalley et al. |
| 4,592,443 A | 6/1986 | Simon |
| 4,624,578 A | 11/1986 | Green |
| 4,688,026 A | 8/1987 | Scribner et al. |
| 4,700,296 A | 10/1987 | Palmer, Jr. et al. |
| 4,738,333 A | 4/1988 | Collier et al. |

(Continued)

FOREIGN PATENT DOCUMENTS

| | | |
|---|---|---|
| EP | 1557807 | 7/2005 |
| WO | 9616845 | 6/1996 |

(Continued)

OTHER PUBLICATIONS

Office Action issued Mar. 28, 2013 by the US Patent and Trademark Office in U.S. Appl. No. 13/229,326.

(Continued)

*Primary Examiner* — Imran Mustafa

(57) ABSTRACT

Selectively enabling a vehicle by way of a portable wireless device. At least some of the illustrative embodiments are methods including: enabling a vehicle when a portable wireless device is communicatively coupled to an onboard device by way of a first communication network; sending an indication of location of the vehicle to a data center; and disabling the vehicle when the portable wireless device is no longer communicatively coupled to the onboard device. In some cases, the sending by: receiving global positioning system (GPS) signals by the portable wireless device; establishing that the portable wireless device is proximate to the vehicle; and sending an indication of location to the data center, the sending by the portable wireless device.

8 Claims, 5 Drawing Sheets

(56) References Cited

U.S. PATENT DOCUMENTS

| | | |
|---|---|---|
| 4,800,590 A | 1/1989 | Vaughan |
| 5,014,206 A | 5/1991 | Scribner et al. |
| 5,132,968 A | 7/1992 | Cephus |
| 5,228,083 A | 7/1993 | Lozowick et al. |
| 5,426,415 A | 6/1995 | Prachar et al. |
| 5,490,200 A | 2/1996 | Snyder et al. |
| 5,495,531 A | 2/1996 | Smiedt |
| 5,510,780 A | 4/1996 | Norris et al. |
| 5,619,573 A | 4/1997 | Brinkmeyer et al. |
| 5,673,318 A | 9/1997 | Bellare et al. |
| 5,708,712 A | 1/1998 | Brinkmeyer et al. |
| 5,775,290 A | 7/1998 | Staerzi et al. |
| 5,797,134 A | 8/1998 | McMillan et al. |
| 5,818,725 A | 10/1998 | McNamara et al. |
| 5,819,869 A | 10/1998 | Horton |
| 5,898,391 A | 4/1999 | Jefferies et al. |
| 5,917,405 A | 6/1999 | Joao |
| 5,970,143 A | 10/1999 | Schneier et al. |
| 6,025,774 A | 2/2000 | Forbes |
| 6,026,922 A | 2/2000 | Horton |
| 6,032,258 A | 2/2000 | Godoroja et al. |
| 6,064,970 A | 5/2000 | McMillan et al. |
| 6,088,143 A | 7/2000 | Bang |
| 6,130,621 A | 10/2000 | Weiss |
| 6,157,317 A | 12/2000 | Walker |
| 6,185,307 B1 | 2/2001 | Johnson, Jr. |
| 6,195,648 B1 | 2/2001 | Simon et al. |
| 6,249,217 B1 | 6/2001 | Forbes |
| 6,278,936 B1 | 8/2001 | Jones |
| 6,353,776 B1 | 3/2002 | Rohrl et al. |
| 6,370,649 B1 | 4/2002 | Angelo et al. |
| 6,380,848 B1 | 4/2002 | Weigl et al. |
| 6,401,204 B1 | 6/2002 | Euchner et al. |
| 6,429,773 B1 | 8/2002 | Schuyler |
| 6,489,897 B2 | 12/2002 | Simon |
| 6,587,739 B1 | 7/2003 | Abrams et al. |
| 6,601,175 B1 | 7/2003 | Arnold et al. |
| 6,611,201 B1 | 8/2003 | Bishop et al. |
| 6,611,686 B1 | 8/2003 | Smith et al. |
| 6,615,186 B1 | 9/2003 | Kolls |
| 6,665,613 B2 | 12/2003 | Duvall |
| 6,714,859 B2 | 3/2004 | Jones |
| 6,717,527 B2 | 4/2004 | Simon |
| 6,741,927 B2 | 5/2004 | Jones |
| 6,804,606 B2 | 10/2004 | Jones |
| 6,812,829 B1 | 11/2004 | Flick |
| 6,816,089 B2 | 11/2004 | Flick |
| 6,816,090 B2 | 11/2004 | Teckchandani et al. |
| 6,828,692 B2 | 12/2004 | Simon |
| 6,868,386 B1 | 3/2005 | Henderson et al. |
| 6,870,467 B2 | 3/2005 | Simon |
| 6,873,824 B2 | 3/2005 | Flick |
| 6,888,495 B2 | 5/2005 | Flick |
| 6,917,853 B2 | 7/2005 | Chirnomas |
| 6,924,750 B2 | 8/2005 | Flick |
| 6,950,807 B2 | 9/2005 | Brock |
| 6,952,645 B1 | 10/2005 | Jones |
| 6,961,001 B1 | 11/2005 | Chang et al. |
| 6,972,667 B2 | 12/2005 | Flick |
| 6,985,583 B1 | 1/2006 | Brainard et al. |
| 6,993,658 B1 | 1/2006 | Engberg et al. |
| 7,005,960 B2 | 2/2006 | Flick |
| 7,015,830 B2 | 3/2006 | Flick |
| 7,020,798 B2 | 3/2006 | Meng et al. |
| 7,031,826 B2 | 4/2006 | Flick |
| 7,031,835 B2 | 4/2006 | Flick |
| 7,039,811 B2 | 5/2006 | Ito |
| 7,053,823 B2 | 5/2006 | Cervinka et al. |
| 7,061,137 B2 | 6/2006 | Flick |
| 7,091,822 B2 | 8/2006 | Flick et al. |
| 7,103,368 B2 | 9/2006 | Teshima |
| 7,123,128 B2 | 10/2006 | Mullet et al. |
| 7,124,088 B2 | 10/2006 | Bauer et al. |
| 7,133,685 B2 | 11/2006 | Hose et al. |
| 7,149,623 B2 | 12/2006 | Flick |
| 7,205,679 B2 | 4/2007 | Flick |
| 7,224,083 B2 | 5/2007 | Flick |
| 7,266,507 B2 | 9/2007 | Simon et al. |
| 7,299,890 B2 | 11/2007 | Mobley et al. |
| 7,323,982 B2 | 1/2008 | Staton et al. |
| 7,327,250 B2 | 2/2008 | Harvey |
| 7,379,805 B2 | 5/2008 | Olsen, III et al. |
| 7,389,916 B2 | 6/2008 | Chirnomas |
| 7,561,102 B2 | 7/2009 | Duvall |
| 7,823,681 B2 | 11/2010 | Crespo et al. |
| 7,873,455 B2 | 1/2011 | Arshad et al. |
| 7,877,269 B2 | 1/2011 | Bauer et al. |
| 7,930,211 B2 | 4/2011 | Crolley |
| 8,018,329 B2 | 9/2011 | Morgan et al. |
| 8,095,394 B2 | 1/2012 | Nowak et al. |
| 8,140,358 B1 | 3/2012 | Ling et al. |
| 8,217,772 B2 | 7/2012 | Morgan et al. |
| 8,370,027 B2 | 2/2013 | Pettersson et al. |
| 2001/0040503 A1* | 11/2001 | Bishop .......................... 340/426 |
| 2002/0019055 A1 | 2/2002 | Brown |
| 2002/0193926 A1 | 12/2002 | Katagishi et al. |
| 2003/0036823 A1 | 2/2003 | Mahvi |
| 2003/0151501 A1 | 8/2003 | Teckchandani et al. |
| 2003/0191583 A1 | 10/2003 | Uhlmann et al. |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel |
| 2004/0204795 A1 | 10/2004 | Harvey et al. |
| 2004/0239510 A1 | 12/2004 | Karsten |
| 2005/0017855 A1 | 1/2005 | Harvey |
| 2005/0033483 A1 | 2/2005 | Simon et al. |
| 2005/0134438 A1 | 6/2005 | Simon |
| 2005/0162016 A1 | 7/2005 | Simon |
| 2005/0270178 A1 | 12/2005 | Ioli |
| 2006/0028431 A1* | 2/2006 | Leong ........................... 345/156 |
| 2006/0059109 A1 | 3/2006 | Grimes |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0082614 A1* | 4/2007 | Mock .......................... 455/41.2 |
| 2007/0176771 A1 | 8/2007 | Doyle |
| 2007/0185728 A1 | 8/2007 | Schwarz et al. |
| 2007/0194881 A1 | 8/2007 | Schwarz et al. |
| 2007/0285207 A1* | 12/2007 | Bates .......................... 340/5.7 |
| 2008/0114541 A1 | 5/2008 | Shintani et al. |
| 2008/0150683 A1* | 6/2008 | Mikan et al. ................. 340/5.31 |
| 2008/0162034 A1 | 7/2008 | Breen |
| 2008/0221743 A1 | 9/2008 | Schwarz et al. |
| 2008/0294302 A1* | 11/2008 | Basir ............................... 701/2 |
| 2009/0043409 A1 | 2/2009 | Ota |
| 2009/0182216 A1 | 7/2009 | Roushey, III |
| 2010/0075655 A1* | 3/2010 | Howarter et al. ............. 455/420 |
| 2010/0148947 A1 | 6/2010 | Morgan et al. |
| 2010/0268402 A1 | 10/2010 | Schwarz et al. |
| 2011/0050407 A1 | 3/2011 | Schoenfeld et al. |
| 2011/0057800 A1 | 3/2011 | Sofer |
| 2011/0084820 A1 | 4/2011 | Walter et al. |

FOREIGN PATENT DOCUMENTS

| | | |
|---|---|---|
| WO | 2007092272 | 8/2007 |
| WO | 2007092287 | 8/2007 |
| WO | WO 2010/068438 A2 | 6/2010 |

OTHER PUBLICATIONS

US 5,699,633, 10/1999, Roser (withdrawn).
On Time Payment Protection Systems, printed Jan. 2, 2004 from www.ontime-pps.com/how.html.
Aircept Products, printed Jan. 2, 2004 from www.aircept.com/products.html.
How PayTeck Works, printed Jan. 2, 2004 from www.payteck.cc/aboutpayteck.html.
Article: "Pager Lets You Locate Your Car, Unlock and Start It", published Dec. 10, 1997 in USA Today.

(56) References Cited

OTHER PUBLICATIONS

Article: "Electronic Keys Keep Tabs on Late Payers", published Sep. 22, 1997 in Nonprime Auto News.
Article: "PASSTEC Device Safely Prevents Vehicles from Starting", published Jul. 19, 1999 in Used Car News.
Payment Clock Disabler advertisement, published, May 18, 1998.
Secure Your Credit & Secure Your Investment (Pay Teck advertisement), printed Jan. 2, 2004 from www. payteck.cc.
iMetrik Company Information, printed Dec. 21, 2006 from imetrik.com.
About C-Chip Technologies, printed Dec. 21, 2006 from www.c-chip.com.
Hi-Tech tools to solve traditional problems, printed Dec. 21, 2006 from www.c-chip.com.
C-Chip Technologies Products: Credit Chip 100, Credit Chip 100C, Credit Chip 200, printed Dec. 21, 2006 from www. c-chip.com.
The Credit Chip 100, printed Dec. 21, 2006 from www.c-chip.com.

* cited by examiner

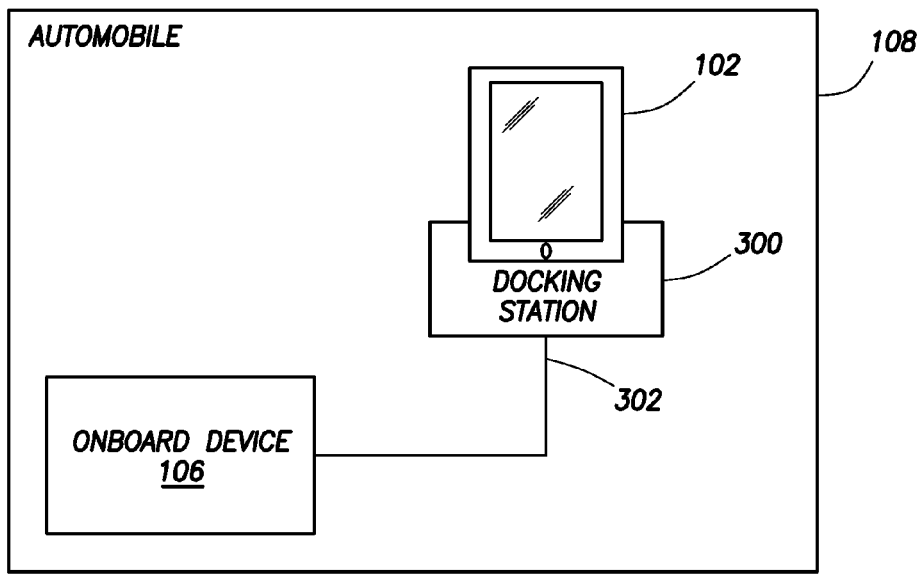
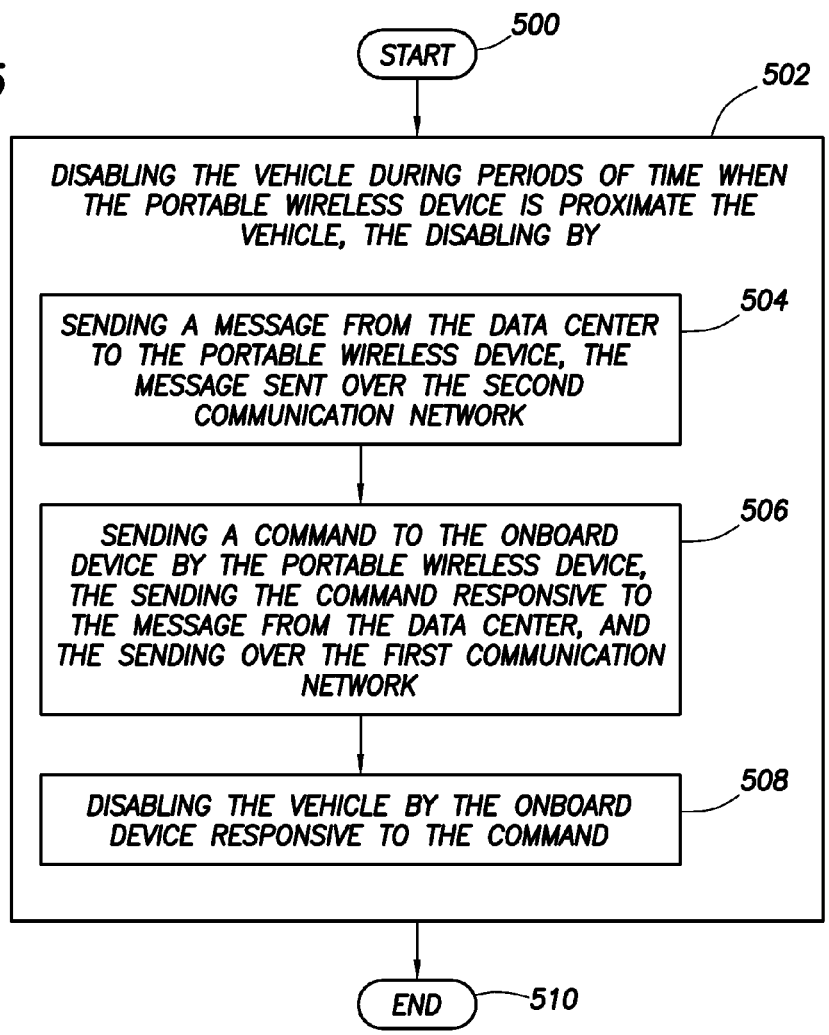

METHODS AND SYSTEMS OF SELECTIVELY ENABLING A VEHICLE BY WAY OF A PORTABLE WIRELESS DEVICE

CROSS-REFERENCE TO RELATED APPLICATIONS

This application is a continuation-in-part of application Ser. No. 12/826,513 filed Jun. 29, 2010, titled "Onboard Starter-Interrupt Device Incorporating Wireless Personal Area Network" which is a divisional of application Ser. No. 11/684,186 filed Mar. 9, 2007, titled "Onboard Starter-Interrupt Device Incorporating Wireless Personal Area Network". Both applications are incorporated by reference herein as if reproduced in full below.

BACKGROUND

Individuals with low credit scores have difficulty financing purchases, such as purchases of automobiles. To the extent such individuals can find companies to finance automobile purchases, many times the financing is through a "buy here, pay here" automobile dealer where the purchaser makes payments directly at the automobile dealer's location. In many cases, the automobile purchased includes an after-market onboard device, installed by the automobile dealer, which enables the dealer to disable the vehicle in the event payments are not made, or not timely made. In some cases, the onboard device has the ability to determine the location of the automobile and send location information to a data center.

Thus, the onboard device of the related-art is a fairly sophisticated device, which includes electronics for: receiving Global Positioning System (GPS) signals; calculating location; communicating with a data center over a wireless communication network (such as cellular telephone network); and disabling the automobile to which the onboard device is affixed. Of course, the functionality drives up the cost per unit, and the communication functionality further carries wireless communication network access charges.

Any advance which reduces the product cost, or reduces operational costs, of the onboard device would provide a competitive advantage in the marketplace.

BRIEF DESCRIPTION OF THE DRAWINGS

For a detailed description of exemplary embodiments, reference will now be made to the accompanying drawings in which:

FIG. 3 shows an automobile with a docking station in accordance with at least some embodiments;

FIG. 5 shows a method in accordance with at least some embodiments; and

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection, or through an indirect connection via other devices and connections.

"Affixed" with respect to an onboard device and a vehicle shall mean that the onboard device is mechanically and electrically coupled to the vehicle such that the onboard device is not physically accessible by an occupant properly seated in the vehicle.

"Portable wireless device" shall mean a handheld device that has the ability to execute third party applications, communicate over a wireless data network, and is not affixed to the vehicle. The fact that a portable wireless device may dock with a docking station while in a vehicle shall not obviate the portable status.

"Proximate", in reference to a portable wireless device and a vehicle, shall mean coupled to the vehicle, within the vehicle, or within two meters of the vehicle.

"Remote" or "remotely", relative to a device or vehicle, shall mean a distance of greater than one kilometer.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or claims. In addition, one skilled in the art will understand that the following description has broad application, and the discussion of any embodiment is meant only to be exemplary of that embodiment, and not intended to intimate that the scope of the disclosure or claims is limited to that embodiment.

Figure 1:
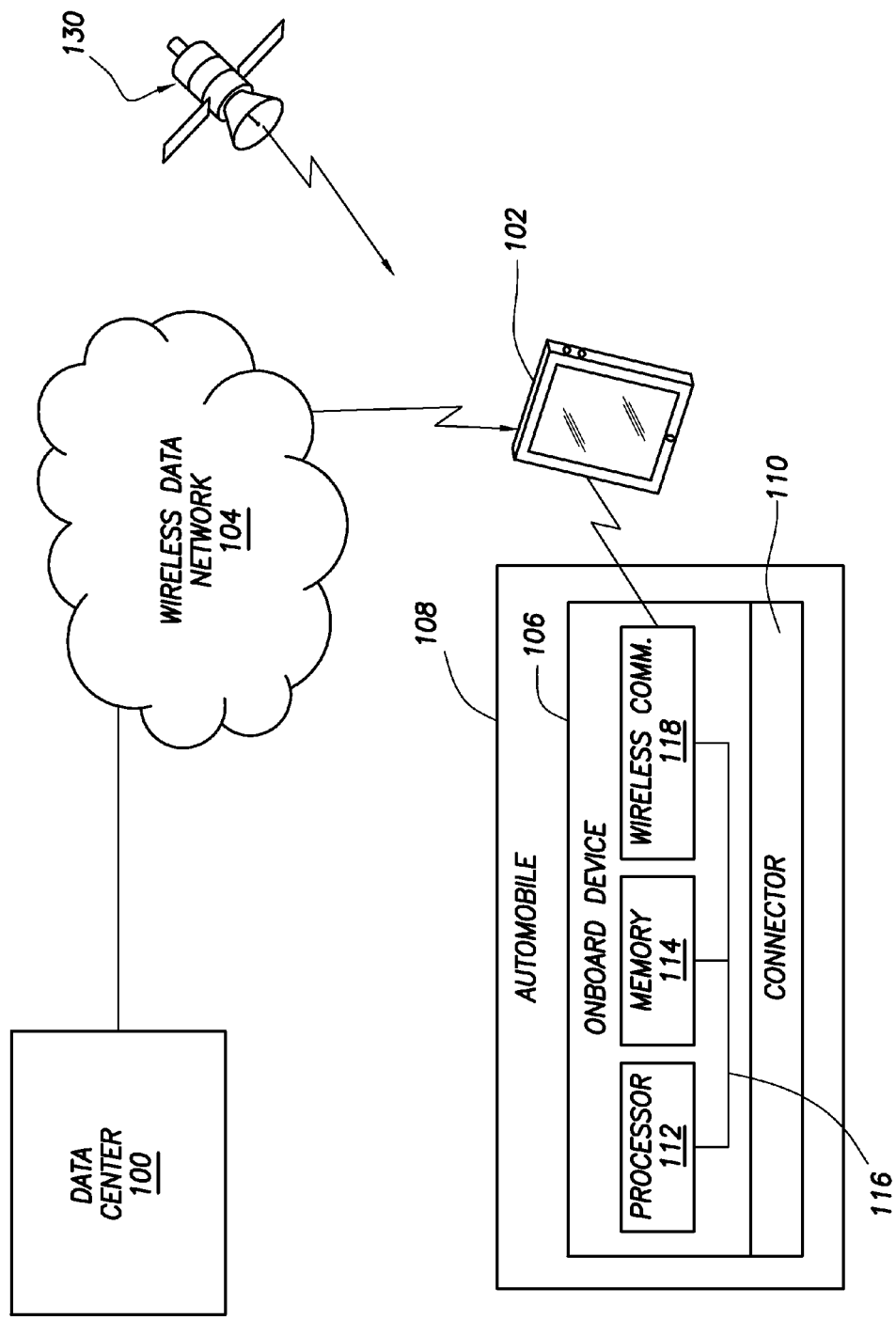
FIG. 1 shows a system in accordance with at least some embodiments.

The various embodiments are directed to systems and methods of using a portable wireless device, such as the smart phone of the driver, as the primary element in providing location and communication services related to selectively locating and disabling of a vehicle, such as an automobile. By having a significant portion of the functionality implemented on a portable wireless device of a person within the automobile, both the cost of the onboard device, as well as the data transmission costs associated with location and/or disablement, are significantly reduced. In most cases the cost of the onboard device is borne by the consumer purchasing the car, and thus the cost to the consumer may be likewise reduced. FIG. 1 shows a system in accordance with at least some embodiments. In particular, major components of the system comprise data center 100, a portable wireless device 102, a wireless data network 104, and an onboard device 106. Each will be discussed in turn.

The data center 100 may comprise one or more computer systems executing software instructions. In some cases, the one or more computer systems of the data center may all be located at a single location; however, in other cases the computer systems of the data center may be remotely located from one another, yet functioning as a data center. In a particular embodiment, one or more computer systems of the data center may be "cloud" computer systems provided under contract from a cloud computing service provider, thus the physical location of the computer systems may not be precisely known to the data center operator, or may change daily or even hourly depending on the amount of computing resources used.

In the illustration of FIG. 1, an onboard device 106 is affixed to an automobile 108. Affixed with respect to an onboard device 108 and an automobile shall mean that the onboard device 108 is mechanically and electrically coupled to the automobile such that the onboard device 108 is not physically accessible by an occupant properly seated in the vehicle. In many cases, the onboard device 106 may reside under or within the dashboard of the automobile. In other cases, the onboard device 106 may be at any suitable location within the automobile, such as in an electrical compartment under the hood, or within the luggage compartment. In a particular embodiment, the onboard device 106 both mechanically and electrically couples to the automobile 108 by way of a connector 110. That is, connector 110 may provide mechanical support that holds the onboard device 106 in place, and by way of the connector 110 the onboard device 106 may electrically couple to other components of the automobile 108, such as the onboard computer or starter solenoid. The connector 110 may be an onboard diagnostic (OBD) version two (hereafter just OBD-II) port. Coupling the onboard device 106 to the illustrative OBD-II port thus gives the onboard device 106 the ability to communicate with one or more computer systems of the automobile 108. In other cases, the connector 110 is a specialty connector within the automobile, such as the starter solenoid relay connector, or fuel pump relay connector.

The onboard device 106 illustrated in FIG. 1 comprises a processor 112 coupled to a memory 114 by way of a bus 116. The memory 114 stores programs executed by the processor 112, and in some cases may be the working the working memory for the processor 112. For example, the memory 114 may be random access memory (RAM) (e.g., dynamic random access memory (DRAM), flash memory), programmable read-only memory (PROM), or combinations. While FIG. 1 shows the processor 112 and memory 114 as separate components, in other cases the processor and memory are an integrated component, such as microcontroller. The processor 112 may communicate with sub-systems of the automobile over the connector 110.

The onboard device 106 further comprises a wireless communication system 118 coupled to the processor 112. By way of the wireless communication system 118, programs of the processor 112 may wirelessly communicate with other devices (i.e., radio frequency communication by way of electromagnetic waves propagating through air), as discussed more below. The wireless communication system 118 may take many forms, but has a limited distance over which communication may take place—a short range communication network. In particular, the range of the wireless communication system 118 need not extend beyond the passenger compartment of the automobile, but because the passenger compartment of an automobile has windows and doors, the range may extend beyond the automobile for a relatively short distance (e.g., two meters). The protocol over which the wireless communication system 118 communicates may likewise take many forms. In one embodiment, the wireless communication system 118 implements a Bluetooth communication protocol. Another example is a ZIGBEE® brand network protocol, where the ZIGBEE® trademark is owned by Zigbee Alliance. Regardless of the type of protocol and range implemented by the wireless communication system 118, when the onboard device 106 is installed and remotely located from the data center 100 the wireless communication system 118 cannot communicate with the data center 100 without an intervening device in the form of the portable wireless device 102.

Portable wireless device 102 is a handheld device that has the ability to execute third party applications, communicate over a wireless data network 104, communicate over the short range communication network (i.e., communicate with the wireless communication system 118 when in range), and is not affixed to the automobile. In some cases, the portable wireless device 102 also places and receives cellular telephone calls. Thus, in some embodiments, the portable wireless device 102 is a "smart phone" possessed by an owner or occupant of the automobile. In most cases, the portable wireless device 102 will be carried by an owner or occupant of the automobile 108, and thus will be out of communication range with the onboard device 106 at times when the owner or occupant is not proximate to the automobile. However, when the owner or occupant approaches the automobile, or is within the automobile, the portable wireless device 102 may establish communication with the onboard device 106.

Figure 2:
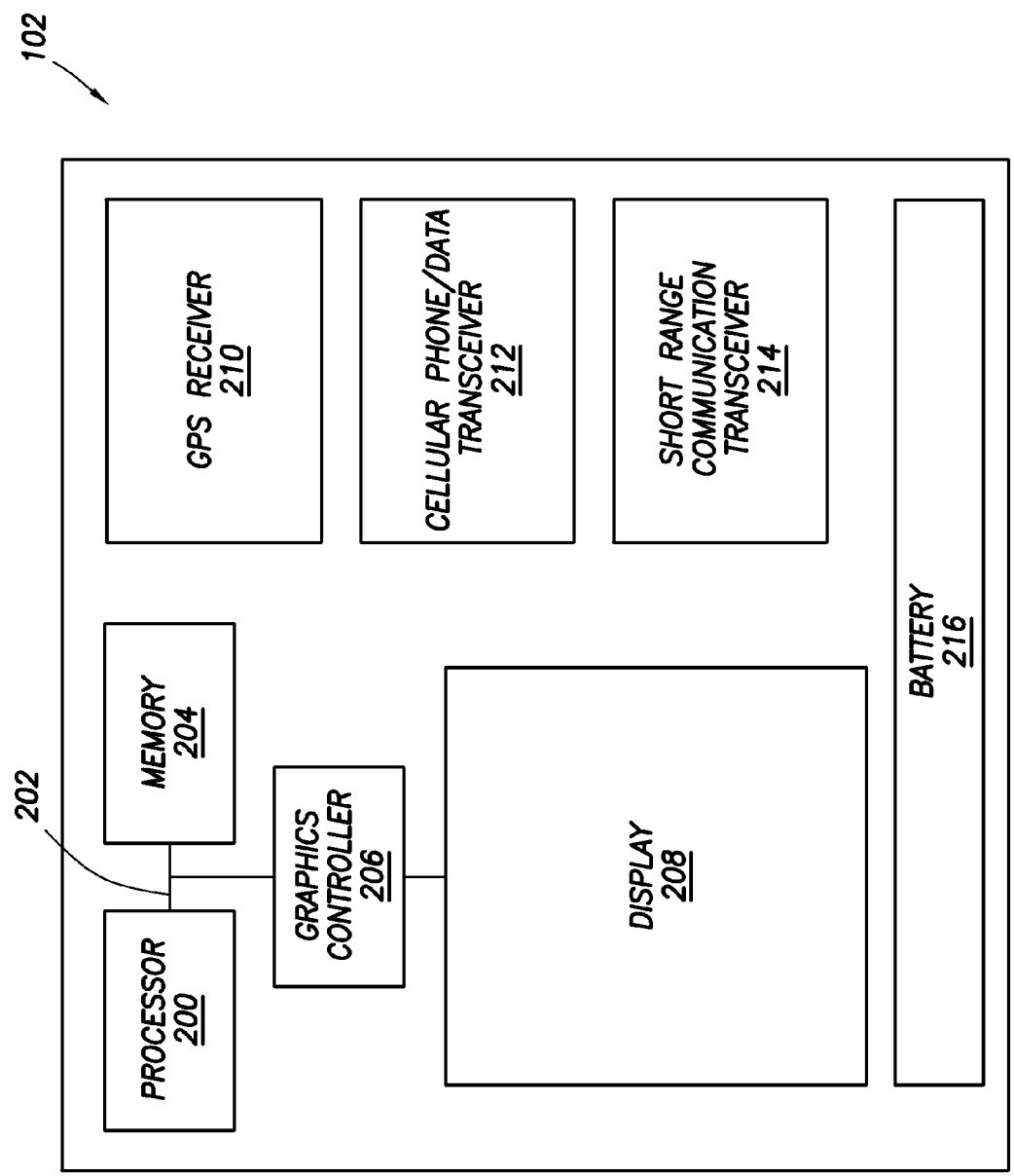
FIG. 2 shows an electrical block diagram of a portable wireless device in accordance with at least some embodiments.

FIG. 2 shows an electrical block diagram of a portable wireless device 102 in accordance with at least some embodiments. In particular, the portable wireless device 102 comprises a processor 200, memory 204, graphics controller 206, display device 208, global positioning system (GPS) receiver 210, cellular phone/data transceiver 212, short range communication transceiver 214, and battery 216. The processor 200 is coupled to memory 204, such as by a bus 202. The memory 204 stores programs executed by the processor 200, and in some cases may be the working the working memory for the processor 200. In some cases, the memory 204 may be random access memory (RAM) (e.g., dynamic random access memory (DRAM), flash memory). The memory 204 may store programs used by the portable wireless device for operation, such as a mobile operating system (e.g., iOS™ brand mobile operating system from Apple, Inc., or the ANDROID™ brand mobile operating system from Google, Inc.) and original equipment manufacturer (OEM) installed programs (e.g., applications to implement placing and receiving cellular phone calls, or messaging services).

A person who carries the portable wireless device 102 may interface with the various programs executed on the device 102 by way of display device 208. The display device 208 may be any display device upon which text and/or images may be formed, such as a liquid crystal display (LCD). In some cases, the display device is controlled by graphics controller 206, but in other cases the graphics controller functionality may be implemented within the processor 200. Though not specifically shown in FIG. 2, the display device may be overlaid with a transparent touch sensitive device such that the portable wireless device implements "touch screen" functionality.

The illustrative portable wireless device 102 further comprises a GPS receiver 210. The GPS receiver 210 receives signals from an array of GPS satellites orbiting the earth, and based on timing associated with arrival of those signals, a position can be determined. In some cases, the GPS receiver 210 has sufficient functionality to calculate position, and thus the data passed to processor 200 may be a direct indication of position. In other cases, the functionality to determine position may be shared between the GPS receiver 210 and software executing on the processor 200. That is, the GPS receiver 210 may receive the plurality of GPS signals and pass the information to a program on the processor 200, which program may then make the determination as to location of the portable wireless device 102.

Still referring to FIG. 2, the portable wireless device further comprises a cellular phone/data transceiver 212, over which voice and data transmission may take place. The transceiver 212 thus implements a wireless communication system and/or protocol (i.e., radio frequency communication by way of electromagnetic waves propagating through air). Any suitable communication protocol may be implemented by the transceiver 212, such as Global System for Mobile Communications (GSM) compliant protocol, a General Packet Radio Service (GPRS) compliant protocol, or a Personal Communications Service (PCS) compliant system. While it is contemplated that in most cases the transceiver 212 will employ both voice and data communications, in some embodiments only a data communication system is implemented (e.g., an IPAD™ brand product available from Apple, Inc.). That is, in some cases the portable wireless device 102 does not provide voice services.

Still referring to FIG. 2, illustrative portable wireless device 102 further comprises a short range communication transceiver 214. By way of the short range communication transceiver 214, programs executed by the processor 200 may communicate with other devices, such as the onboard device 106. The short range communication transceiver 214 may take many forms, but has a limited distance over which communication may take place. In a particular embodiment, the transceiver 214 is a wireless transceiver (i.e., radio frequency communication by way of electromagnetic waves propagating through air), and need not have a range larger than the passenger compartment of the automobile 108 to which the onboard device 106 is affixed. Because the passenger compartment of an automobile has windows and doors, the portable wireless device 102 may establish communication when in close proximity to the automobile 108 (e.g., within two meters). The protocol over which the short range communication transceiver 214 communicates may take many forms, but will be compatible with the protocol of the wireless communication system 118 of the onboard device 106. Thus, the short range communication transceiver 214 may implement any suitable system, such as a Bluetooth communication protocol, or a ZIGBEE® brand communication protocol.

Returning again to FIG. 1, in order for the onboard device 106 to have the ability to reliably establish communication with the data center 100, in accordance with various embodiments the portable wireless device 102 is considered a "key" to the car. That is, in one embodiment onboard device 106 is configured to disable the automobile 108 at any time the portable wireless device 102 is not communicatively coupled to the onboard device 106 by way of the wireless communication system 118, and the onboard device 106 is configured to enable the automobile 108 at any time the portable wireless device 102 is communicatively coupled to the onboard device 106 by way of the wireless communication system 118.

Disabling and enabling of the automobile 108 based on proximity of the portable wireless device 102 may take many forms. In some embodiments, the onboard device 106 is mechanically and electrically coupled to connector 110 in the form of the OBD-II port as discussed above. When connected to the OBD-II port, the onboard device 106 may communicate with one or more computer systems of the automobile 108, and thus may disable the automobile by any suitable technique, such as disabling the ability to crank the engine, disabling the spark ignition system, disabling the fuel system, or a combination. An onboard device 106 configured to couple to the OBD-II port may also have the ability to read or determine data associated with the vehicle, such as determining the identity of the vehicle (e.g., by reading the VIN number).

In other embodiments, the onboard device 106 may be a relay replacement device. For example, a starter relay is a device within an automobile that, when activated, provides electrical current to the solenoid of the starter. The onboard device 106 in the form a starter relay replacement device may thus act as an operational starter relay when the portable wireless device 102 is communicatively coupled, but in the event communication is lost with the portable wireless device 102 the onboard device 106 may not provide current to the solenoid in spite of a command to do so. Thus, connector 110 may be a relay connector. In yet still other cases, the onboard device 106 may be a relay replacement device for any system that could disable the vehicle (e.g., either prevents the motor from starting, or prevents the motor from continuing to operate).

The portable wireless device 102 and onboard device 106 also enable further functionality regarding the data center 100. In particular, the data center 100 (e.g., at the behest of a lien holder on the automobile) may periodically need to determine the location of the automobile 108 (e.g., to ensure the automobile has not been moved out of state). In accordance with the various embodiments, location services are based on the portable wireless device 102. That is, in accordance with at least some embodiments determining the location of the automobile 108 may involve the data center 100 communicating with the portable wireless device 104 by way of the wireless data network 104. It is noted that reference to communication with the portable wireless device 104 by way of the wireless data network 104 shall not be read to require that the data center 100 wirelessly couple to the data network 104. The communication by the data center 100 to the portable wireless device 102 may thus request an indication of location. The portable wireless device 102, in turn, may establish whether the device 102 is communicatively coupled to the onboard device 106. If the portable wireless device 102 is not communicatively coupled to the onboard device 106, the portable wireless device 102 may notify the data center 100, and/or wait until communication is established with the onboard device 106.

Assuming the portable wireless device is or becomes communicatively coupled with the onboard device 106, the wireless device 102 then activates its GPS receiver 210 to receive signals from a plurality of GPS satellites (illustrated by satellite 130) and determine location. Once a location is established, the location information is sent to the data center 100 over the wireless data network 104. Thus, location of the automobile may be determined in spite of the fact the onboard device 106 does not have the capability to determine location.

In yet still further embodiments, the data center 100 may periodically need to disable the automobile 108. For example, in the event a payment is missed, or some other contractual obligation is breached (e.g., automobile moved to a non-approved location) the automobile 108 may be disabled. As with the location services, in accordance with the various embodiments disablement services are based on the portable wireless device 102. That is, in accordance with at least some embodiments disabling the automobile 108 may involve the data center 100 communicating with the portable wireless device 104 by way of the wireless data network 104. The portable wireless device 102, in turn, may establish whether the device 102 is communicatively coupled to the onboard device 106. If the portable wireless device 102 is not communicatively coupled to the onboard device 106, the portable wireless device 102 may notify the data center 100, and/or wait until communication is established with the onboard device 106.

Assuming the portable wireless device is or becomes communicatively coupled with the onboard device 106, the portable wireless device 102 then sends a command to the onboard device 106. The onboard device, in turn, disables the automobile. Thus, the automobile may be disabled in spite of the fact the onboard device 106 does not have the capability to communicate with the data center 100 over the wireless data network 104.

In accordance with yet still further embodiments, the data center 100 may periodically need to communicate with the owner or occupant of the automobile 108. For example, in the event a payment due date is approaching, or the automobile is approaching a contractual boundary, the data center 100 may send a message to the owner or occupant. In accordance with at least some embodiments, sending a message by the data center 100 may involve the data center 100 communicating with the portable wireless device 102 by way of the wireless data network 104. The portable wireless device 102, in turn, may display the message on the display device 208. The message may take many forms. In some cases the message is text message (e.g., short messaging service (SMS) text communication). In yet still other embodiments, the message may take the form of series of TCP/IP packets exchanged between a program executing on the portable wireless device 102 and the computer systems of the data center 100.

The various embodiments discussed to this point have been based on embodiments where the portable wireless device 102 wirelessly couples to the onboard device 106. However, in yet still further embodiments the portable wireless device may couple to a docking station within the automobile, and further communicatively couple with the onboard device 106 by way of one or more conductors. FIG. 3 shows a block diagram of further embodiments that utilize a docking station. In particular, FIG. 3 shows a docking station 300 mechanically coupled to the automobile 108. The docking station may take many forms depending on the nature of the portable wireless device 102. For example, for a portable wireless device 102 in the form of an IPHONE™ brand product (produced by Apple, Inc. of Cupertino, Calif.), the docking station 300 may comprise the proprietary IPHONE™ connector along with one or more mechanism to physically hold the IPHONE™. Thus, the docking station 300 may both mechanically couple the portable wireless device 102 to the automobile, and electrically couple the portable wireless device 102 to the onboard device 106. In some cases, one or more conductors 302 may couple between the docking station 300 and the onboard device 106, thus establishing a communication network. The conductors may be either electrical or optical conductors. It is noted again, however, that coupling the portable wireless device 102 to a docking station 300 when the device 102 is within the automobile shall not, for purposes of the claims, obviate the portable status of the device 102.

Figure 4:
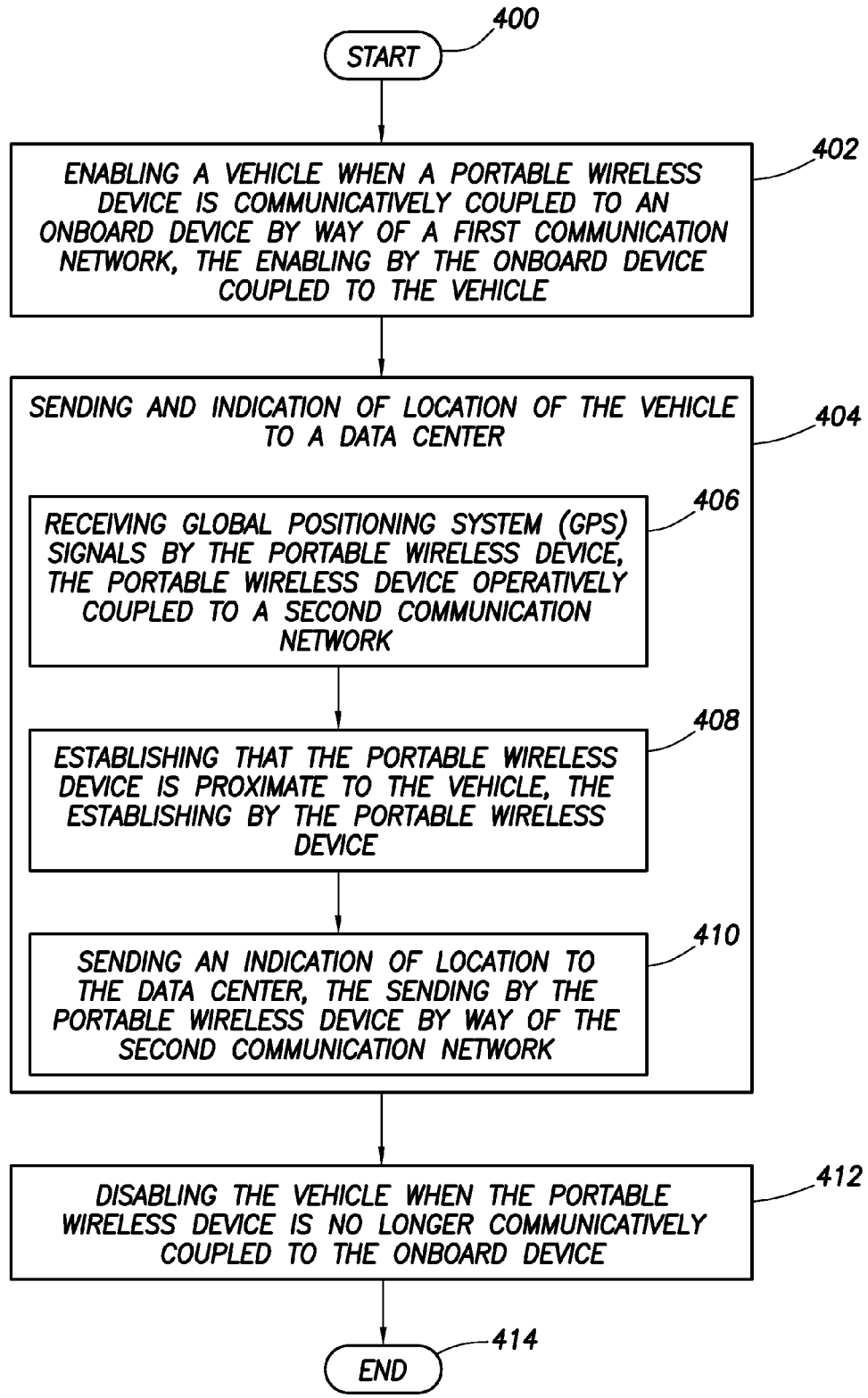
FIG. 4 shows a method in accordance with at least some embodiments.

FIG. 4 shows a method in accordance with at least some embodiments, some of which may be implemented in software executed at the data center and/or the portable wireless device. In particular, the method starts (block 400) and comprises: enabling a vehicle when a portable wireless device is communicatively coupled to an onboard device by way of a first communication network, the enabling by the onboard device coupled to the vehicle (block 402); sending an indication of location of the vehicle to a data center (block 404); and disabling the vehicle when the portable wireless device is no longer communicatively coupled to the onboard device (block 412). The sending (again block 404) may comprise: receiving global positioning system (GPS) signals by the portable wireless device, the portable wireless device operatively coupled to a second communication network (block 406); establishing that the portable wireless device is proximate to the vehicle, the establishing by the portable wireless device (block 408); and sending an indication of location to the data center, the sending by the portable wireless device by way of the second communication network (block 410). Thereafter, the method ends (block 414).

FIG. 5 shows a method in accordance with at least some embodiments, some of which may be implemented in software executed at the data center and/or the portable wireless device. In particular, the method starts (block 500) and comprises disabling the vehicle during periods of time when the portable wireless device is proximate the vehicle (block 502). In some cases, the disabling is by: sending a message from the data center to the portable wireless device (block 504); sending a command to the onboard device by the portable wireless device, the sending the command responsive to the message from the data center (block 506); and disabling the vehicle by the onboard device responsive to the command (block 508). Thereafter, the method ends (block 510).

Figure 6:
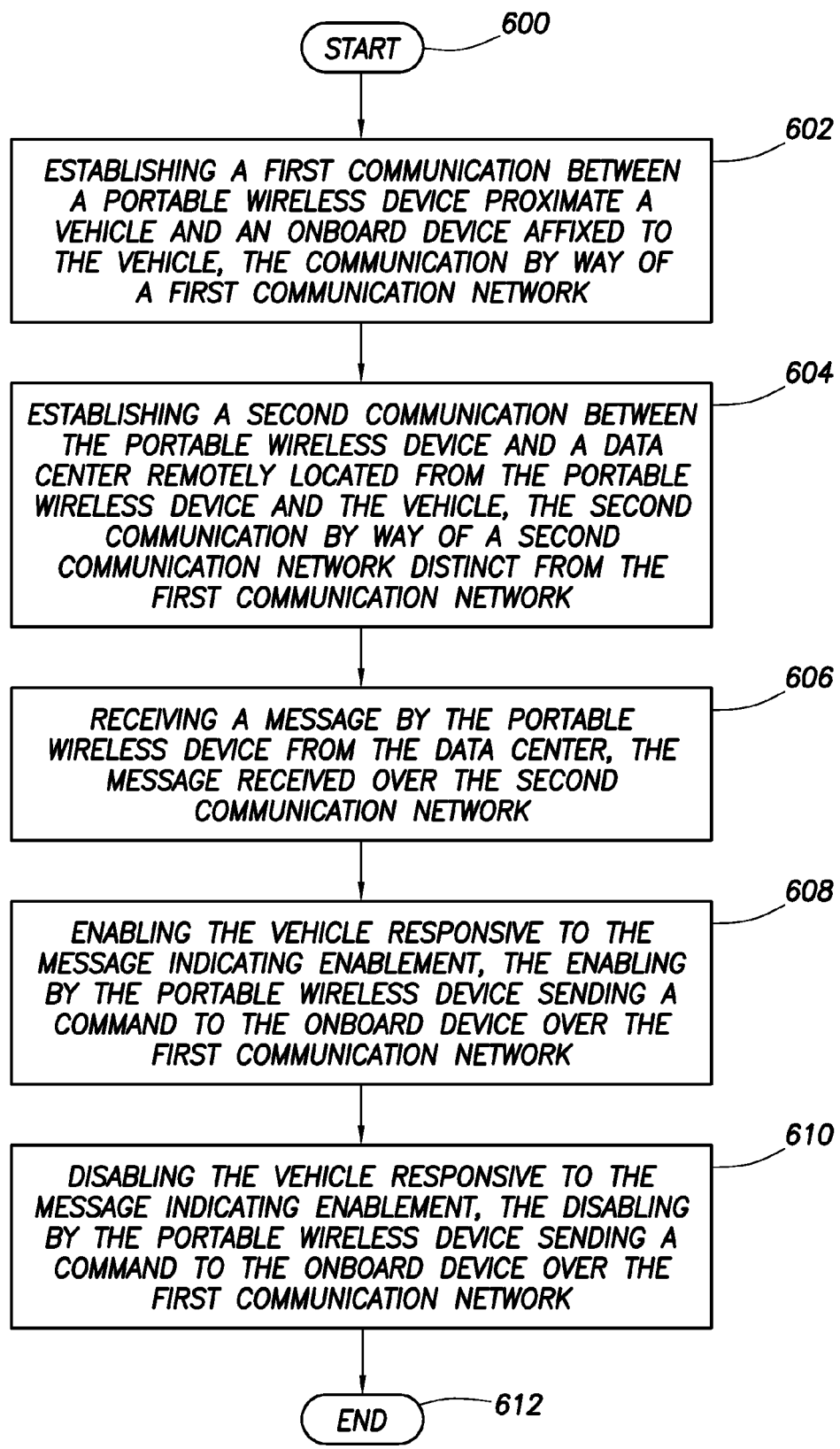
FIG. 6 shows a method in accordance with at least some embodiments.

FIG. 6 shows a method in accordance with at least some embodiments, some of which may be implemented in software executed at the data center and/or the portable wireless device. In particular, the method starts (block 600) and comprises: establishing a first communication between a portable wireless device proximate a vehicle and an onboard device affixed to the vehicle, the first communication by way of a first communication network (block 602); establishing a second communication between the portable wireless device and a data center remotely located from the portable wireless device and the vehicle, the second communication by way of a second communication network distinct form the first communication network (block 604); receiving a message by the portable wireless device from the data center, the message received over the second communication network (block 606); enabling the vehicle responsive to the message indicating enablement, the enabling by the portable wireless device sending a command to the onboard device over the first communication network (block 608); and disabling the vehicle responsive to the message indicating disablement, the disabling by the portable wireless device sending a command to the onboard device over the first communication network (block 610). Thereafter, the method ends (block 612).

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

References to "one embodiment", "an embodiment", "a particular embodiment" indicate that a particular element or characteristic is included in at least one embodiment of the invention. Although the phrases "in one embodiment", "an embodiment", and "a particular embodiment" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, the onboard device, particularly in the relay embodiments, may be just a relay operated at the behest of a digital output of the wireless communication system 118, thus omitting the processor 112 and memory 114. It is intended that the following claims be interpreted to embrace all such variations and modifications.

What is claimed is:

1. A method comprising:
   enabling a vehicle when a portable wireless device is communicatively coupled to an onboard device by way of a first communication network, the enabling by the onboard device coupled to the vehicle;
   sending an indication of location of the vehicle to a data center, the sending by:
      receiving global positioning system (GPS) signals by the portable wireless device, the portable wireless device operatively coupled to a second communication network distinct from the first communication network;
      establishing that the portable wireless device is proximate to the vehicle, the establishing by the portable wireless device; and
      sending an indication of location to the data center, the sending by the portable wireless device by way of the second communication network;
   disabling the vehicle when the portable wireless device is no longer communicatively coupled to the onboard device.

2. The method of claim 1 further comprising:
   reading an indication of the identity of the vehicle, the reading by the portable wireless device over the first communication network; and
   sending an indication of identity of the vehicle to the data center over the second communication network.

3. The method of claim 1 wherein establishing that the portable wireless device is proximate the vehicle further comprises establishing whether the portable wireless device is communicatively coupled to the onboard device.

4. The method of claim 1 further comprising:
   disabling the vehicle during periods of time when the portable wireless device is proximate the vehicle, the disabling by:
      sending a message from the data center to the portable wireless device, the message sent over the second communication network;
      sending a command to the onboard device by the portable wireless device, the sending the command responsive to the message from the data center, and the sending over the first communication network; and
      disabling the vehicle by the onboard device responsive to the command.

5. The method of claim 1 further comprising sending a notification to an occupant of the vehicle, the sending by:
   sending the message to the portable wireless device by the data center, the sending over the second communication network; and
   displaying the message on a display device of the portable wireless device.

6. The method of claim 1 wherein the first communication network is a wireless network.

7. The method of claim 1 wherein the first communication network comprises at least one selected from the group consisting of: an electrical conductor; and an optical conductor.

8. The method of claim 1 wherein the onboard device cannot independently communicate with the data center.

* * * * *